United States Patent
Buerba et al.

(10) Patent No.: US 11,334,844 B1
(45) Date of Patent: May 17, 2022

(54) ELECTRONIC MARKETPLACE DROP SHIPPING

(71) Applicant: Stamps.com Inc., El Segundo, CA (US)

(72) Inventors: Sebastian Buerba, Marina Del Rey, CA (US); John Roland Clem, Manhattan Beach, CA (US); James Nathan Jones, Austin, TX (US); Amine George Khechfe, Cupertino, CA (US)

(73) Assignee: Stamps.com Inc., El Segundo, CA (US)

( * ) Notice: Subject to any disclaimer, the term of this patent is extended or adjusted under 35 U.S.C. 154(b) by 220 days.

(21) Appl. No.: 16/802,364

(22) Filed: Feb. 26, 2020

(51) Int. Cl.
*G06Q 10/08* (2012.01)
*G06Q 20/40* (2012.01)
(Continued)

(52) U.S. Cl.
CPC ....... *G06Q 10/0835* (2013.01); *G06Q 10/087* (2013.01); *G06Q 20/385* (2013.01); *G06Q 20/405* (2013.01); *G06Q 30/018* (2013.01); *G06Q 30/0605* (2013.01); *G06Q 30/0615* (2013.01); *G06F 16/953* (2019.01)

(58) Field of Classification Search
None
See application file for complete search history.

(56) References Cited

U.S. PATENT DOCUMENTS 8,473,425 B1 * 6/2013 Maurer ............... G06Q 10/083
705/336
10,586,073 B1 * 3/2020 Armato ............ G06Q 30/0635
(Continued)

FOREIGN PATENT DOCUMENTS

WO WO-0113309 A2 * 2/2001 ............. G06Q 30/06

OTHER PUBLICATIONS

Anon., "OrderTrust Adds Proxy Inventory to Its Order Management Service Offerings," Business Wire [New York] Jul. 12, 2000. (Year: 2000).*

*Primary Examiner* — Nicholas D Rosen
(74) *Attorney, Agent, or Firm* — Norton Rose Fulbright US LLP

(57) ABSTRACT

Systems and methods which provide for order fulfilment using drop shipping from participating suppliers in an electronic marketplace are described. A drop shipping management system may utilize various rules and information regarding merchants, suppliers, items, etc. in facilitating electronic marketplace drop shipping. Drop shipping management systems may, for example, utilize merchant drop ship rules with respect to merchant drop ship information for determining whether drop shipping is to be provided for a merchant with respect to one or more items in the electronic marketplace. Further, drop shipping management systems may utilize supplier drop ship rules with respect to supplier drop ship information in determining a supplier to provide drop shipping with respect to one or more items in the electronic marketplace. Drop shipping management of embodiments provides a many-to-many drop shipping solution in which multiple merchants are connected to multiple drop ship suppliers in an electronic marketplace environment.

40 Claims, 2 Drawing Sheets

(51) Int. Cl.
*G06Q 30/06* (2012.01)
*G06Q 20/38* (2012.01)
*G06Q 30/00* (2012.01)
*G06F 16/953* (2019.01)

(56) References Cited

U.S. PATENT DOCUMENTS

2004/0260570 A1* 12/2004 Dunn .................. G06Q 20/203
705/22
2014/0316940 A1* 10/2014 Kirchenbauer .... G06Q 30/0609
705/26.35

* cited by examiner

ELECTRONIC MARKETPLACE DROP SHIPPING

TECHNICAL FIELD

The present invention relates generally to order fulfilment and, more particularly, to facilitating order fulfilment using drop shipping from participating suppliers in an electronic marketplace.

BACKGROUND OF THE INVENTION

It is commonplace for various merchants, whether they be "brick and mortar" merchants, online merchants, or casual sellers (collectively referred to herein as merchants) to sell items through an electronic marketplace (e.g., eBay, Amazon Marketplace, Shopify, etc.). Items purchased from merchants of an electronic marketplace are typically shipped to purchasers. For example, merchants may use a number of forms of shipping services and media, such as letters, flats, and parcels, via various shipping service providers, such as the United States Postal Service (USPS), United Parcel Service (UPS), Federal Express (FedEx), Dalsey, Hillblom and Lynn (DHL), local and regional couriers, trucking companies providing truckload (TL) services and/or less than truckload (LTL) services (e.g., J. B. Hunt, Arkansas Best Freight (ABF), YRC Freight, etc.), rideshare services (e.g., Uber, Lyft, etc.), and/or the like in providing items to purchasers. Merchants may, for example, utilize various shipping services offered by shipping service providers, often having different shipping parameters, transit times, costs, shipper/recipient/shipped item qualifications, etc. associated therewith.

The shipping provided for items purchased through an electronic marketplace can have a significant impact upon the purchaser's user experience with respect to the electronic marketplace and/or merchant. For example, the distance between the merchant's shipping location and the purchaser and the particular shipping services utilized can have a significant impact on the shipping transit time and cost for shipping an item. Although a higher service level shipping service (e.g., expedited shipping, overnight shipping, two day shipping, etc.) may be utilized to reduce shipping transit time, such higher service level shipping services come at a higher cost for shipping the items. Whether the costs for shipping an item is borne by the merchant or by the purchaser, higher costs for shipping the items may adversely impact the purchase transaction (e.g., the merchant and/or purchaser may determine that shipping costs are too high to justify the sale/purchase of the item, the purchaser may purchase the item from another merchant with lower shipping costs, etc.). Alternatively, using a lower service level shipping service (e.g., ground shipping, parcel post, first class mail, etc.) may reduce costs for shipping the items, such lower service level shipping services come at a cost of longer transit times, and often fewer service features (e.g., tracking, signature for delivery, etc.). Such increased transit times and unavailability of service features may adversely impact the purchase transaction (e.g., the purchaser may purchase the item from another merchant with higher level shipping services, the purchaser may be dissatisfied with the merchant's level of service and forego future purchases from the merchant and/or through the electronic marketplace, etc.). Accordingly, shipping provided with respect to items purchased through an electronic marketplace is often an important part of the transaction and user experience.

Merchants, however, are often not equipped to or otherwise capable of understanding and evaluating all of their options with respect to shipping their items sold through an electronic marketplace, and thus may utilize unnecessarily high level shipping services resulting in excessive costs for shipping items or utilize unsatisfactorily low level shipping services resulting in poor user experience. For example, with the innumerable e-commerce merchants and marketplaces, not only have the number of items shipped increased appreciably in recent years, but so too have the number of shippers and recipients of such items. Accordingly, there is an increasing number of mid-sized, small, and even individual merchants shipping an increasing number of items, wherein these merchants are typically less sophisticated with respect to shipping and thus are less likely to utilize various available shipping services or otherwise optimize aspects of item shipment.

BRIEF SUMMARY OF THE INVENTION

The present invention is directed to systems and methods which provide for order fulfilment using drop shipping from participating suppliers in an electronic marketplace. Drop shipping of items purchased through an electronic marketplace according to embodiments of the invention may provide for improved user experience and/or reduced shipping costs. For example, drop shipping implemented according to embodiments may employ a supplier having a shipping location more near a purchaser than a merchant selling the item in order to provide a suitably low shipping transit time using a lower cost (e.g., lower service level) shipping service to improve user experience and/or reduce shipping cost. As another example, drop shipping implemented according to embodiments may enable a merchant to sell items not stocked by the merchant (e.g., items currently out of stock at the merchant, items complementary to and often purchased with items that the merchant stocks, etc.) to improve user experience.

A drop shipping management system may be utilized according to embodiments of the invention for providing drop shipping with respect to an electronic marketplace. For example, drop shipping management logic may be provided in a shipping management system utilized by a plurality of merchants with respect to an electronic marketplace. Additionally or alternatively, a drop shipping management system may be provided separately from, possibly independent of, a shipping management system. Irrespective of the particular implementation, drop shipping management systems of embodiments interface with merchants of an electronic marketplace for facilitating drop shipping for merchants electing to utilize drop shipping by merchants electing to be suppliers providing drop shipping.

A drop shipping management system of embodiments may utilize various rules and information regarding merchants, suppliers, items, etc. in facilitating electronic marketplace drop shipping. Drop shipping management systems may, for example, utilize merchant drop ship rules with respect to merchant drop ship information for determining whether drop shipping is to be provided for a merchant with respect to one or more items in the electronic marketplace. Additionally or alternatively, drop shipping management systems may utilize supplier drop ship rules with respect to supplier drop ship information in determining a supplier to provide drop shipping with respect to one or more items in the electronic marketplace. Drop shipping management systems may, for example, utilize merchant rating information in association with supplier drop ship rules and supplier drop ship information in determining a supplier to provide drop shipping. Drop shipping management systems of embodiments of the invention may utilize merchant inventory information, such as accessed via a shipping management system utilized with respect to the electronic marketplace by a plurality of merchants, to determine whether drop shipping is to be provided with respect to one or more items.

Drop shipping management provided according to embodiments of the present invention provides a many-to-many drop shipping solution in which multiple merchants are connected to multiple drop ship suppliers in an electronic marketplace environment. Accordingly, a drop shipping management system may operate with respect to multiple merchants and multiple drop ship suppliers for implementing drop shipping with respect to one or more transactions in the electronic marketplace, such as to implement a permutation of a drop shipping solution determined to be overall best with respect to the merchants and suppliers. Although such a drop shipping solution may not be ideal or optimized with respect to a particular merchant and/or supplier, the drop shipping solution may nevertheless be optimized or otherwise determined best for the aggregate merchants and suppliers.

In accordance with embodiments of the invention, drop ship suppliers are merchants in an electronic marketplace that have elected to be suppliers providing drop shipping for other merchants in the electronic marketplace. To facilitate use of such drop shipping by various merchants (e.g., to allay or otherwise alleviate concerns with respect to the merchant's customers being pilfered by another merchant having acted as a drop ship supplier), information regarding a purchaser may be protected from the drop ship supplier by the drop shipping management system. For example, a drop shipping management system of embodiments may protect purchaser information from a drop ship supplier at least until a shipping label is printed for shipping the item (e.g., a point at which re-entry of customer information into the merchant's system would be required and/or wherein only limited purchaser information is available).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
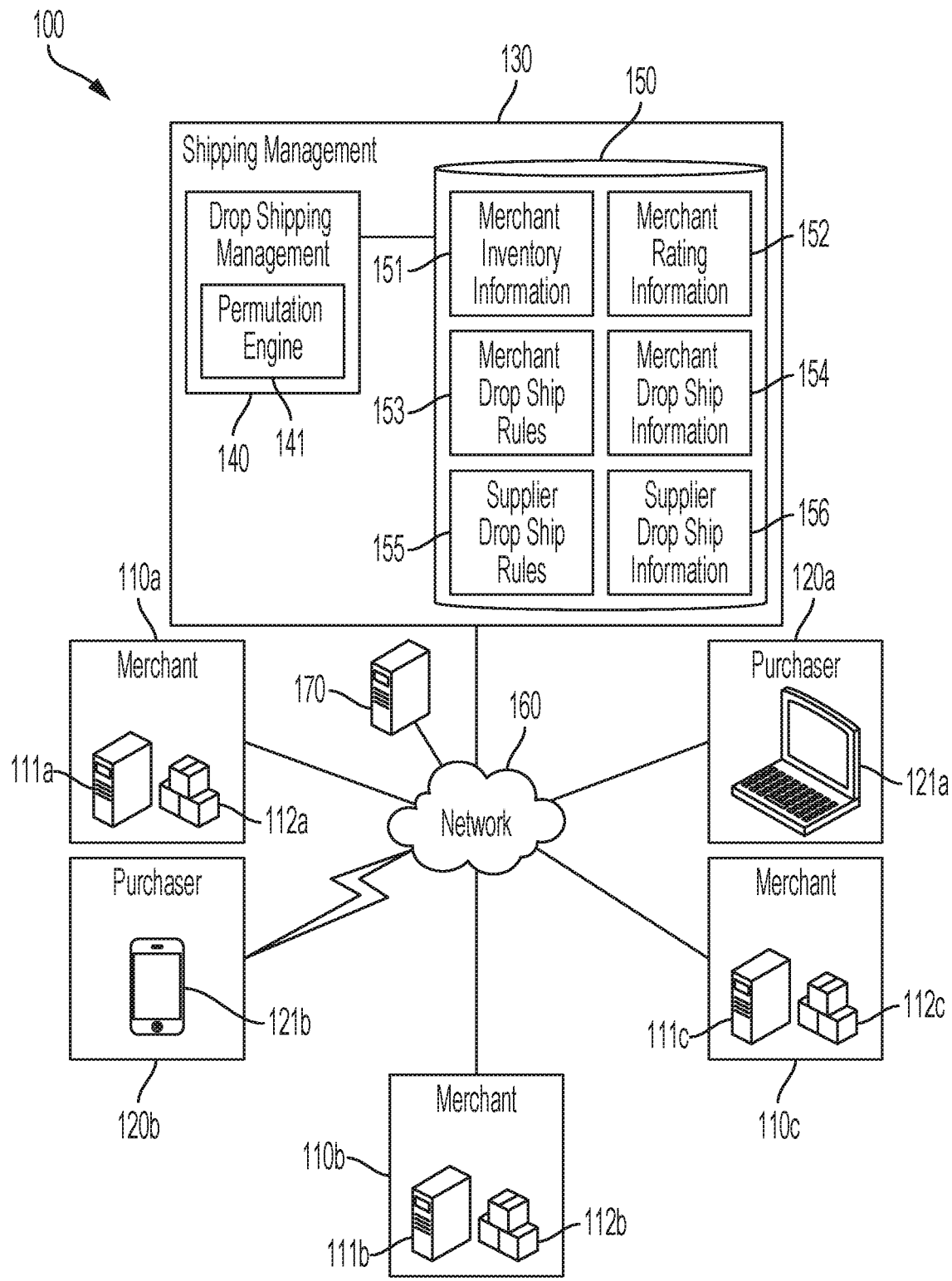
FIG. 1 shows a block diagram of an electronic marketplace environment in which a drop shipping management system is provided according to embodiments of the present invention.

An embodiment of a drop shipping management system as may be utilized to provide drop shipping with respect to an electronic marketplace in accordance with the concepts herein is shown in FIG. 1. In particular, FIG. 1 shows electronic marketplace environment 100 in which a plurality of merchants (shown as merchants 110a-110c) may conduct transactions with a plurality of purchasers (shown as purchasers 120a and 120b), such as using electronic marketplace system 170, wherein drop shipping management logic 140 is operable to facilitate order fulfilment using drop shipping from various ones of the merchants participating as drop ship suppliers. Electronic marketplace system 170 may, for example, comprise one or more systems (e.g., web server, electronic commerce server, computer workstation, enterprise computer network, user interface portal, etc.) of an electronic marketplace, such as eBay, Amazon Marketplace, Shopify, etc. Network 160 provides communication links with respect to and between merchant systems, purchaser systems, shipping management systems, drop shipping management systems, electronic marketplace systems, and/or other systems of electronic marketplace environment 100 for facilitating operation as described herein. Accordingly, the links of network 160 are operable to provide suitable communication links for facilitating cooperative interaction and data transfer as described with respect to embodiments of the invention. Network 160 of embodiments may thus comprise one or more of a local area network (LAN), metropolitan area network (MAN), wide area network (WAN), wireless LAN (WLAN), the Internet, intranet, extranet, cable transmission system, cellular communication network, the public switched telephone network (PSTN), and/or the like.

In the example of FIG. 1, drop shipping management logic 140 may comprise one or more instruction sets (e.g., program code) executed by a processor or processors of shipping management system 130 to provide functionality as described herein. Shipping management system may, for example, comprise one or more processor-based systems (e.g., web server, electronic commerce server, computer workstation, enterprise computer network, user interface portal, etc.) comprising one or more processors (e.g., a CORE or PENTIUM processor available from Intel, Inc.) and requisite processor readable (e.g., computer readable) memory (e.g., random access memory (RAM), read only memory (ROM), flash memory, disk memory, solid state drive (SSD) memory, optical memory, and/or the like) and input/output components (e.g., display, network interface card (NIC), keyboard, digital pointer, printer, and/or the like) coupled to a processor of the one or more processors via a data bus. Shipping management system 130 is shown in the illustrated embodiment in communication with network 160, such as for providing communication with any or all of merchant systems 111a-111c, purchaser systems 121a and 121b, etc. Such a shipping management system may provide automation of tasks associated with the purchase and sale of items performed using electronic marketplace system 170 in electronic marketplace environment 100. For example, shipping management system 130 may provide functionality for the management of item orders, managing the picking and packing of items for order fulfilment, generation of invoices, packing slips, manifests, shipping labels, and postage or other prepaid shipping indicia, and/or tracking of shipment of items through a shipping service provider. Shipping management system 130 of embodiments may comprise some or all of the functionality of a shipping management system, such as the SHIPSTATION shipping management system provided by Auctane LLC of Austin Tex., adapted to further provide for drop shipping management according to the concepts herein.

Although the illustrated embodiment of drop shipping management logic 140 provides for shipping management system 130 as a processor-based host thereof, embodiments of drop shipping management logic 140 may be provided separately from, and even independent of, a shipping management system. For example, drop shipping management logic 140 may be executed by one or more processor-based systems (e.g., web server, electronic commerce server, computer workstation, enterprise computer network, user interface portal, etc.) to provide a standalone drop shipping management system in communication with network 160 operable to provide drop shipping functionality in accordance with the concepts herein. Implementations of drop shipping management logic hosted by a shipping management system (shown in the example of FIG. 1) and drop shipping management logic hosted by one or more separate processor based systems (not shown) are each referred to herein as drop shipping management systems. It should be appreciated that the components of such drop shipping management systems may be implemented as a single system, such as a single server, or as a distributed system, such as a server farm, a number of host systems disposed remotely with respect to each other, etc.

In operation of electronic marketplace environment 100, merchants 110*a*-110*c* offer various items, shown as items 112*a*-112*c*, for purchase by purchasers 120*a*-120*b* through electronic marketplace system 170, wherein purchased items are typically shipped to the purchaser or a location designated by the purchaser. One or more of merchants 110*a*-110*c* may additionally or alternatively provide fulfilment services (e.g., fulfilment providers) with respect to items purchased by purchasers through electronic marketplace system 170, possibly without themselves directly offering items for purchase through the electronic marketplace. Accordingly, merchant systems 111*a*-111*c* of embodiments are configured to cooperate with electronic marketplace system 170, such as to conduct item sale transactions (e.g., e-commerce sales transactions, such as may include order processing, payment processing, remittance to intermediaries or other parties for items sold, etc.) with various purchasers of the merchant's goods (e.g., via purchaser systems 121*a* and 121*b*), and/or item fulfilment operations (e.g., inventory management, item picking and packaging scheduling, shipping/delivery label and/or other documentation generation, etc.). Merchant systems 111*a*-111*c* of embodiments may thus comprise processor-based systems operable under control of an instruction set or instruction sets defining operation as described herein. For example, merchant systems 111*a*-111*c* of embodiments each comprise one or more processors (e.g., a CORE or PENTIUM processor available from Intel, Inc.) and requisite processor readable (e.g., computer readable) memory (e.g., RAM, ROM, flash memory, disk memory, SSD memory, optical memory, and/or the like) and input/output components (e.g., display, NIC, keyboard, digital pointer, printer, and/or the like) coupled to a processor of the one or more processors via a data bus.

Purchaser systems 121*a* and 121*b* of embodiments herein provide systems by which a purchaser of items may interact with a merchant offering the items via electronic marketplace system 170 to facilitate procuring items by the purchaser. Purchaser systems 121*a* and 121*b* of embodiments may comprise any number of system configurations used by a user for selecting, purchasing, or otherwise requesting one or more items to be procured by the purchaser from a merchant. For example, either or both of purchaser systems 121*a* and 121*b* may comprise a general purpose processor-based system (e.g., personal computer (PC) having a processor, memory, suitable input/output (I/O) functionality, and operating system (OS)) operating under control of an instruction set (e.g., a client application such as a PC client, web client, mobile client, tablet client, etc.) to interface with any of merchant systems 111*a*-111*c* and provide operation as described herein. Additionally or alternatively, either or both of purchaser systems 121*a* and 121*b* may comprise a processor-based mobile device such as a smart phone, a tablet device, a personal digital assistant (PDA), an Internet appliance (e.g., a processor-based electronic commerce appliance), etc., having the requisite instruction set and processing and I/O resources. As another example, either or both of purchaser systems 121*a* and 121*b* may comprise a smart speaker (e.g., Amazon ECHO, Google HOME, etc.) or other voice interface (e.g., Apple SIRI, Google Assistant, etc.) operating on a processor-based platform and operable to provide functionality as described herein.

The particular number of merchant systems, purchaser systems, electronic marketplace systems, shipping management systems, and drop shipping management logic/drop shipping management systems shown in FIG. 1 are for simplifying the illustration and are not a limitation of the present invention. It should be appreciated that electronic marketplace environment 100 of embodiments may host different numbers of merchants, purchasers, electronic marketplaces, shipping management systems, and drop shipping management logic/drop shipping management systems. For example, thousands, tens of thousands, hundreds of thousands, or even millions of merchants and/or purchasers may be present in electronic marketplace environment 100. Correspondingly, one or more instances drop shipping management logic 140 of embodiments of the invention may be utilized to perform drop shipping functionality with respect to such different numbers of merchants and purchasers.

A drop shipping management system implementing drop shipping management logic 140 of embodiments is configured to interface with merchants of electronic marketplace environment 100 for facilitating drop shipping for merchants electing to utilize drop shipping by merchants electing to be suppliers providing drop shipping. Such drop shipping may be provided with respect to a variety of scenarios. For example, drop shipping facilitated by drop shipping management logic 140 may employ a merchant acting as a drop ship supplier having a shipping location more near a purchaser than a merchant selling the item. In such a scenario, the drop shipping may enable the use of shipping services having a lower level of service than would be required if the item were shipped by the merchant selling the item while nevertheless meeting service level requirements of the purchaser, or may enable meeting a service level requirement of the purchaser not otherwise attainable if the item were shipped by the merchant selling the item. Additionally or alternatively, drop shipping in such a scenario may provide for reduced shipping costs to the merchant to sell the item and/or the purchaser. As another example, drop shipping facilitated by drop shipping management logic 140 may employ a merchant acting as a drop ship supplier offering items not stocked by a merchant selling the item. In such a scenario, the drop shipping may enable a merchant to nevertheless sell items not stocked by the merchant, such as items currently out of stock at the merchant, items complementary to and often purchased with items that the merchant stocks but which the merchant does not stock, etc.

Irrespective of the particular impetus for drop shipping, drop shipping management systems of embodiments of the invention facilitate order fulfilment using drop shipping on behalf of a merchant of merchants 110*a*-110*c* electing to utilize drop shipping by one or more other merchants of merchants 110*a*-110*c* electing to participate as drop ship suppliers in an electronic marketplace environment 100. In operation according to embodiments, drop shipping management logic 140 utilizes various rules and information regarding merchants, suppliers, items, etc. in facilitating drop shipping with respect to electronic marketplace environment 100. For example, drop shipping management logic 140 of embodiments may utilize any or all of merchant inventory information 151, merchant rating information 152, merchant drop ship rules 153, merchant drop ship information 154, supplier drop ship rules 155, and/or supplier drop ship information 156, as may be stored by database 150 in communication therewith. It should be appreciated that database 150 storing merchant inventory information 151, merchant rating information 152, merchant drop ship rules 153, merchant drop ship information 154, supplier drop ship rules 155, supplier drop ship information 156, and/or other data files utilized by drop shipping management logic 140 may be provided internal to a drop shipping management system and/or external thereto. As will be discussed in further detail below, various portions of the foregoing rules and information may be generated by operation of systems (e.g., merchant systems, purchaser systems, shipping management systems, drop shipping management systems, and/or electronic marketplace systems) of electronic marketplace 100, may be input by users (e.g., via merchant systems and/or purchaser systems), may be pre-established by system administrators/managers, etc.

Drop shipping management logic 140 may, for example, utilize merchant drop ship rules 153 for determining whether drop shipping is to be provided for a merchant with respect to one or more items of a transaction in the electronic marketplace. Merchant drop ship rules 153 may utilize merchant drop ship information 154 (e.g., information regarding selection to use drop shipping, information indicating that drop shipping is to be used with respect to particular electronic marketplaces and/or particular transactions, item sales prices and item profit margin thresholds for drop shipped items, information regarding situations in which drop shipping is to be provided, information regarding particular purchasers for which drop shipping is to be provided and/or is not to be provided, information regarding particular delivery areas for which drop shipping is to be provided and/or is not to be provided, information regarding particular scenarios for which drop shipping is to be provided and/or is not to be provided, one or more preferences regarding drop shipping, etc.) and/or other information available within electronic marketplace environment 100 in determining instances where drop shipping is to be provided.

Merchant drop ship rules 153 may, for example, comprise various rules established by users (e.g., merchants and/or purchasers) or others (e.g., system administrators/managers) controlling application of drop shipping with respect to particular merchants, purchasers, items, transactions, electronic marketplaces, scenarios, etc. For example, merchant drop ship rules may be defined for determining if a particular merchant has elected to utilize drop shipping, particular items, transactions, purchasers, electronic marketplaces, scenarios, delivery areas, etc. for which drop shipping is to be provided and/or is not to be provided, and the like. Such merchant drop ship rules may utilize various information available within electronic marketplace environment 100 in applying one or more such rules. For example, embodiments of merchant drop ship rules 153 utilize information of merchant inventory information 151, merchant drop ship information 154, and/or supplier drop ship information 156 with respect to application of one or more rules thereof.

One or more merchants of merchants 110*a*-110*c* electing to utilize drop shipping may input (e.g., via an associated one of merchant systems 111*a*-111*c*) a selection to use drop shipping as part of their respective merchant drop ship information 154, such as to indicate that drop shipping management logic 140 should operate with respect to electronic marketplace transactions conducted by the merchant. These merchants may input various information useful for controlling application of drop shipping with respect to particular items, transactions, etc. by merchant drop ship rules 153. For example, merchants may provide information, as part of their respective merchant drop ship information 154, such as item sales prices and item profit margin thresholds for items that drop shipping is to be provided for, as may be used by various rules of merchant drop ship rules 153 in determining particular items for which drop shipping is to be provided, situations in which drop shipping is to be provided for particular items, etc. It should be appreciated that the foregoing information is exemplary, and that information of merchant inventory information 151 and/or merchant drop ship information 154 may additionally or alternatively include various other information, such as depending upon the particular rules (e.g., merchant drop ship rules and/or supplier drop ship rules) implemented by drop shipping management logic 140. For example, merchant drop ship information 154 of embodiments may include information regarding particular purchasers for which drop shipping is to be provided and/or is not to be provided, particular delivery areas (e.g., postal zones, cities, states, countries, etc.) for which drop shipping is to be provided and/or is not to be provided, particular electronic marketplaces for which drop shipping is to be provided and/or is not to be provided, particular scenarios (e.g., merchant currently out of stock of an item, an item complementary to or often purchased with an item stocked by the merchant, etc.) for which drop shipping is to be provided and/or is not to be provided, and/or the like. As a further example, merchant drop ship information 154 of embodiments may include merchant preferences regarding drop shipping (e.g., one or more preferences of the merchant to guide or prioritize drop shipping determinations, such as to prioritize certain shippers and/or demote certain shippers, indicating a preference for drop shipping in particular situations, such as where a requested or guaranteed delivery date is otherwise at risk or where an item is being reshipped due to return of an item, etc.).

Additionally or alternatively, drop shipping management logic 140 may utilize supplier drop ship rules 155 for determining whether a merchant, that has elected to be a drop ship supplier, to provide drop shipping with respect to one or more items of a transaction in the electronic marketplace. Supplier drop ship rules 155 may utilize supplier drop ship information 156 (e.g. information regarding selection to provide drop shipping, information indicating that drop shipping is to be provided with respect to particular electronic marketplaces and/or particular transactions, remaining item inventory thresholds, merchant remittance amount thresholds, service level thresholds, information regarding particular purchasers for which drop shipping is to be supplied and/or is not to be supplied, particular delivery areas for which drop shipping is to be supplied and/or is not to be supplied, particular scenarios for which drop shipping is to be supplied and/or is not to be supplied, one or more preferences regarding drop shipping, etc.) and/or other information available within electronic marketplace environment 100 in determining merchants to be drop ship suppliers for instances where drop shipping is to be provided.

Supplier drop ship rules 155 may, for example, comprise various rules established by users (e.g., merchants and/or purchasers) or others (e.g., system administrators/managers) for identifying one or more merchants as drop ship suppliers of a candidate supplier set and/or to select a merchant as the drop ship supplier (e.g., selected from a candidate supplier set) for particular merchants, purchasers, items, transactions, electronic marketplaces, scenarios, etc. For example, supplier drop ship rules may be defined for determining if a particular merchant has elected to provide drop shipping (e.g., act as a drop ship supplier), particular items, transactions, merchants, purchasers, electronic marketplaces, scenarios, delivery areas, etc. for which drop shipping is to be provided and/or is not to be provided, and the like. Such supplier drop ship rules may utilize various information available within electronic marketplace environment 100 in applying one or more such rules. For example, embodiments of supplier drop ship rules 155 utilize information of merchant inventory information 151, merchant rating information 152, merchant drop ship information 154, and/or supplier drop ship information 156 with respect to application of one or more rules thereof.

One or more merchants of merchants 110a-110c electing to provide drop shipping with respect to one or more items may input (e.g., via an associated one of merchant systems 111a-111c) a selection to act as a drop ship supplier as part of their respective merchant drop ship information 154, such as to indicate that drop shipping management logic 140 should consider the merchant for selection as a drop ship supplier with respect to electronic marketplace transactions conducted by another merchant. These merchants may input various information useful for controlling selection of a drop ship supplier with respect to particular items, transactions, etc. by supplier drop ship rules 155. For example, merchants may provide information, as part of their respective supplier drop ship information 155, such as remaining item inventory threshold, merchant remittance amount threshold, and service level threshold for items that drop shipping is to be provided for, as may be used by various rules of supplier drop ship rules 155 in determining sets of candidate drop ship suppliers and/or drop ship suppliers to provide drop shipping for particular items, situations, etc. in which drop shipping is to be provided. It should be appreciated that the foregoing information is exemplary, and that information of supplier drop ship information 155 may additionally or alternatively include various other information, such as depending upon the particular rules (e.g., merchant drop ship rules and/or supplier drop ship rules) implemented by drop shipping management logic 140. For example, supplier drop ship information 155 of embodiments may include information regarding particular purchasers for which drop shipping is to be supplied and/or is not to be supplied, particular delivery areas (e.g., postal zones, cities, states, countries, etc.) for which drop shipping is to be supplied and/or is not to be supplied, particular electronic marketplaces for which drop shipping is to be supplied and/or is not to be supplied, particular scenarios (e.g., selling merchant currently out of stock of an item, an item complementary to or often purchased with an item stocked by the selling merchant, etc.) for which drop shipping is to be supplied and/or is not to be supplied, and/or the like. As a further example, supplier drop ship information 155 of embodiments may include supplier preferences regarding drop shipping (e.g., one or more preferences of the shipper to guide or prioritize drop shipping determinations, such as to prioritize certain merchants and/or demote certain merchants, indicating a preference for providing drop shipping in particular situations, such as where an item is being shipped to a purchaser that is not part of the shipper's customer base or where the remaining item inventory, merchant remittance amount, or service level meet a preference threshold, etc.).

Information in addition to or in the alternative to the foregoing merchant drop ship information and supplier drop ship information may be utilized in the application of merchant drop ship rules and/or supplier rules by drop shipping management logic 140 of embodiments. For example, drop shipping management logic 140 may utilize information of merchant inventory information 151 (e.g., in determining to use drop shipping with respect to particular items, transactions, merchants, etc., in selecting merchants as drop ship suppliers, etc.) and/or merchant rating information 152 (e.g., in selecting merchants as drop ship suppliers, etc.).

Merchant inventory information 151 used by drop shipping management logic 140 may, for example, comprise item inventory information regarding items of the merchant's goods stocked at various stocking locations, drop ship item information regarding items for which drop shipping is to be provided, information regarding costs of particular items, sale prices for particular items, size and/or weight attributes of particular items, and/or the like. Item inventory information may be useful in determining if items matching those selected by a purchaser are available from a selling merchant and/or are available from a drop ship supplier merchant (e.g., stocked in sufficient quantity so as to be in excess of any applicable minimum threshold for a particular stocking location). Drop ship item information may be useful in determining particular items for which drop shipping may be utilized. Item cost and sale price information may be utilized in determining whether drop shipping with respect to a particular item is to be provided for a particular selling merchant, by a particular drop ship supplier, in a particular transaction, etc. Item attribute information (e.g., size and weight) may be utilized in determining costs associated with drop shipping, determining whether drop shipping with respect to a particular item is to be provided, etc.

One or more merchants of merchants 110a-110c may input (e.g., via an associated one of merchant systems 111a-111c) some or all such merchant inventory information as part of their respective merchant inventory information 151. Additionally or alternatively, information of embodiments of merchant inventory information 151 may be obtained from or otherwise made available through access to one or more of the merchants' systems, such as ERP, POS, and inventory management systems. Further, information of merchant inventory information 151 may additionally or alternatively be obtained from or otherwise made available through access to shipping management system 130 and/or electronic marketplace system 170, such as where either or both of these systems access or maintain item inventory information for performing one or more functions.

Merchant rating information 152 used by drop shipping management logic 140 may, for example, comprise supplier accuracy rating information, supplier time rating information, and/or the like. Supplier accuracy rating information may be useful in comparing various merchants for consideration as a drop ship supplier, in determining if a merchant is to be considered (e.g., included in a candidate supplier set) for selection as a drop ship supplier, etc. Supplier time rating information may be useful in modifying one or more metrics for comparing various merchants for consideration as a drop ship supplier, for drop ship supplier selection, etc.

One or more systems of electronic marketplace 100 may generate some or all such merchant rating information. For example, logic of shipping management system 130 and/or electronic market place system 170 may monitor and/or collect information regarding a merchant's accuracy in fulfilling orders (e.g., orders fulfilled by a merchant as a selling merchant, orders fulfilled by a merchant as a drop ship supplier, or a combination thereof) and determine one or more supplier accuracy rating metrics of merchant rating information 152 for that merchant. Purchaser feedback regarding whether an item received was or was not the item purchased may be utilized according to embodiments to generate supplier accuracy rating information. Additionally or alternatively, information regarding returned items may be analyzed and utilized to generate supplier accuracy rating information. As another example, logic of shipping management system 130 and/or electronic market place system 170 may monitor and/or collect information regarding a merchant's ability to meet shipping deadlines (e.g., shipping cutoff times for shipping orders that day, shipment delivery deadlines, etc.) and determine one or more supplier time rating metrics of merchant rating information 152 for that merchant. Package tracking information (e.g., indicating when a package for a particular fulfillment has been received by a shipping service provider, indicating when a package was delivered to a purchaser, etc.) may be utilized according to embodiments to generate supplier time rating information. Additionally or alternatively, purchaser feedback regarding whether an item was received on time or not may be utilized to generate supplier time rating information.

Drop shipping management logic 140 of embodiments of the invention utilizes one or more rules of merchant drop ship rules 153 with merchant inventory information 151, merchant drop ship information 154, and/or other information available within electronic marketplace environment 100 for determining whether drop shipping is to be provided for a selling merchant with respect to one or more items in the electronic marketplace of electronic marketplace system 170. Additionally or alternatively, drop shipping management logic 140 of embodiments utilizes one or more rules of supplier drop ship rules 155 with merchant inventory information 151, merchant rating information 152, supplier drop ship information 156, and/or other information available within electronic marketplace environment 100 for determining one or more drop ship suppliers for providing drop shipping with respect to one or more items in the electronic marketplace. For example, a candidate supplier set may be identified using one or more rules of supplier drop ship rules 155 with respect to merchant inventory information 151 and/or supplier drop ship information 156, wherein one or more rules of supplier drop ship rules 155 may be used with respect to merchant rating information 152 in selecting a drop ship supplier from the candidate supplier set.

It should be appreciated that a number of attributes, in addition to or in alterative to the above mentioned merchant inventory information, supplier drop ship information, and merchant rating information, may be utilized in the selection of a drop ship supplier with respect to any particular transaction in electronic marketplace environment 100. For example, although a number of merchants may have elected to provide drop shipping, have appropriate items in stock for drop shipping, and have satisfactory merchant rating metrics, various other attributes corresponding to the merchant may nevertheless be utilized in determining if the merchant is to be selected as a drop ship supplier in any particular transaction. For example, the location of the merchant's item stocking location(s), the shipping service levels offered/supported by the merchant, the merchant's shipping cutoff times for shipping orders that day, etc. may provide metrics (e.g., shipping transit times, costs, expected item delivery date, shipping service level, etc.) for consideration of merchants from a candidate supplier set as a drop ship supplier. Accordingly, drop shipping management logic 140 of embodiments of the invention operates to analyze one or more such attributes in addition to or in the alternative to merchant rating information for selecting a drop ship supplier from the candidate supplier set.

Drop shipping management provided according to embodiments of drop shipping management logic 140 provides a many-to-many drop shipping solution in which multiple merchants are connected to multiple drop ship suppliers in an electronic marketplace environment. Accordingly, a drop shipping management system may operate with respect to multiple merchants and multiple drop ship suppliers for implementing drop shipping with respect transactions in electronic marketplace 100.

In operation according to embodiments, multiple transactions may be occurring between merchants and purchasers in electronic marketplace 100 wherein drop shipping is to be provided for multiple items. Although a first merchant may provide a "best" drop ship supplier selection for a particular transaction (e.g., merchant's shipping location disposed most near the purchaser, lowest cost item and/or shipping provided, highest shipping service level, etc.), there nevertheless may be other merchants providing an "adequate" drop ship supplier selection for the transaction (e.g., meeting most or all service level requirements, pricing and cost considerations, etc.). In some situations, if the first merchant is selected as a drop ship supplier for a first transaction (i.e., the "best" drop ship supplier selection for the first transaction), no merchant may remain available for selection as a drop ship supplier for a second transaction. For example, if the first merchant is unable able to serve as a drop ship supplier for both the first and second transactions (e.g., only having one instance of an item purchased in both the first and second transactions), and no other merchant can adequately serve as a drop ship supplier with respect to the second transaction (e.g., no other merchant having the item purchased in both the first and second transactions is able to adequately meet the service level requirements of the second transaction), selecting the first merchant as a drop ship supplier for the first transaction (e.g., due to being the "best" drop ship supplier selection for the first transaction) leaves no other merchants to provide a drop ship supplier selection with respect to the item for the second transaction.

Embodiments of drop shipping management logic 140 therefore implement permutation engine 141 to analyze various permutations of drop ship supplier selections for adequately serving multiple transactions occurring between merchants and purchasers in electronic marketplace 100. Permutation engine 141 of embodiments comprises logic for analyzing combinations of merchants of one or more candidate supplier sets for identifying drop ship supplier selections suitable for serving all, or as many as possible, item drop shipments (e.g., meeting minimum service level preferences/requirements, such as delivery timeframe, special shipping/delivery services, costs, etc.) for a plurality of transactions in electronic marketplace 100. For example, overlapping merchants in the candidate supplier sets for multiple transactions (i.e., merchants included as candidate suppliers for multiple transactions) may be analyzed (e.g., with respect to a number of attributes and/or metrics, such as the location of the merchant's item stocking location(s), the shipping service levels offered/supported by the merchant, the merchant's shipping cutoff times for shipping orders that day, shipping transit times, costs, expected item delivery date, shipping service level, etc.) to determine selections of drop ship suppliers for all items of a plurality of transactions. Embodiments of permutation engine 141 may, for example, utilize a permutation matrix populated with the overlapping merchants of the candidate supplier sets of multiple transactions for identifying a selection of drop ship suppliers optimized or otherwise determined best for the aggregate merchants and suppliers (e.g., a drop shipping solution determined to be overall best with respect to the selling merchants and drop ship suppliers).

Electronic marketplace environment 100 may facilitate a large number of transactions being conducted simultaneously, or in very close temporal proximity, and thus the foregoing permutation analysis and aggregate drop ship supplier determination may be performed by drop shipping management logic 140 (e.g., using permutation engine 141) in real-time (e.g., as the transactions are being conducted by electronic marketplace 170). Additionally or alternatively, embodiments of the present invention may operate to perform permutation analysis and aggregate drop ship supplier determination in a batch mode, wherein the drop ship supplier selection for one or more transaction is delayed in time (e.g., with respect to the transaction being conducted by electronic marketplace 170), such as to allow for aggregation of multiple transactions, or more transactions, such as to increase the number of permutations considered. Such batch mode operation may not only accommodate situations in which a large number of transactions are not being conducted simultaneously or otherwise in very close temporal proximity, but may also facilitate improved aggregate drop ship supplier determinations (e.g., providing better drop ship supplier selections with respect to a larger number of the transactions).

It should be appreciated that aggregate drop ship supplier determinations provided according to embodiments of the invention may be made with respect to transactions of a plurality of electronic marketplaces. That is, where some merchants elect to be suppliers providing drop shipping with respect to transactions of multiple electronic marketplaces and the same items for which drop shipping is to be provided are purchased via those electronic marketplaces, drop shipping management logic 140 (e.g., using permutation engine 141) may analyze candidate supplier sets for the transactions of the multiple electronic marketplaces and provide aggregate drop ship supplier determinations across those electronic marketplaces.

As can be appreciated from the foregoing, drop ship suppliers selected for providing drop shipment of items according to embodiments of the invention are themselves merchants in an electronic marketplace that have elected to be suppliers providing drop shipping for other merchants. Accordingly, a selling merchant may experience trepidation with respect to electing to utilize such drop shipping due to a perceived risk of losing customers to merchants selected as drop ship suppliers for the selling merchant's transactions. To facilitate use of such drop shipping by various merchants, information regarding a purchaser may be protected from the drop ship supplier by drop shipping management logic 140 of embodiments. For example, drop shipping management logic 140 may provide control for one or more aspect of shipping management system 130 with respect to management of drop shipping of items herein. In some embodiments, drop shipping management logic 140 provides an instruction or otherwise causes shipping management system 130 to protect purchaser information from a drop ship supplier at least until a shipping label is printed for shipping the item (e.g., a point at which re-entry of customer information into the merchant's system would be required and/or wherein only limited purchaser information is available). Shipping management system 130 may, for example, withhold identification of the purchaser from the merchant selected as a drop ship supplier until a shipping label is printed for the drop shipment under control of the shipping management system. In some embodiments, drop shipping management logic 140 provides an instruction or otherwise causes shipping management system 130 to withhold purchaser information from a drop ship supplier. Shipping management system 130 may, for example, provide a unique code for the shipment without providing identification of the purchaser to the drop ship supplier. Such a unique code (e.g., an alphanumeric code, a barcode, a quick response (QR) code, etc.) may be included on a package carrying a drop shipped item (e.g., as part of a preprinted supply of shipping boxes/packages, printed as part of a shipping label, etc.), and may be later scanned for use with respect to the drop shipment. For example, shipping service provider package routing scanning equipment may be able to directly scan the unique code, obtain purchaser shipping address information, and route the package accordingly. Alternatively, the unique code may be scanned (e.g., by a shipping service provider) and a shipping label produced to include purchaser shipping address information (e.g., a complete shipping label to be applied to the package, such as an over-label). In any case, embodiments protect purchaser contact information (e.g., email address and telephone number) that may readily be used to solicit the purchaser for future purchases (it being understood that shipping address information is typically only useful for direct mail marketing which is in disfavor due to cost and time concerns, and that withholding the purchaser's shipping address until printing a shipping label requires re-entry of customer information into the merchant's system which further increases the cost of its use for soliciting the purchaser).

Figure 2:
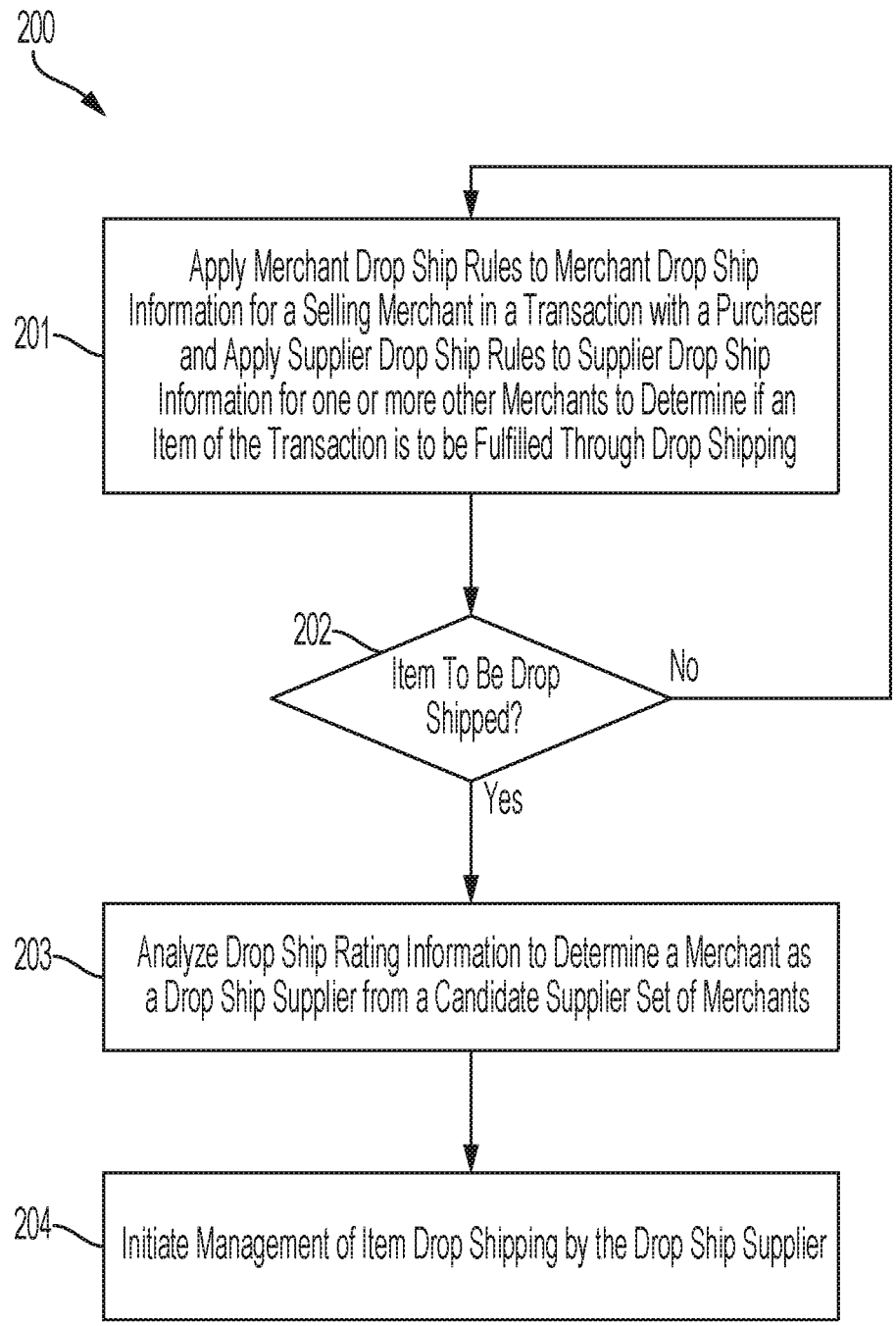
FIG. 2 shows a high level flow diagram of operation providing drop shipping with respect to an electronic marketplace in accordance with embodiments of the present invention.

Having described systems of the electronic marketplace environment of FIG. 1 and their configuration for providing order fulfilment using drop shipping from participating merchant suppliers in one or more electronic marketplaces, reference is now made to FIG. 2 wherein flow 200 illustrates operation to provide drop shipping in accordance with embodiments of the present invention. The functions of flow 200 may, for example, comprise operations performed and/or directed by drop shipping management logic 140 discussed above.

In the illustrated example of flow 200, a drop shipping management system has been previously provisioned for operation. For example, various data files (e.g., merchant inventory information 151, merchant rating information 152, merchant drop ship rules 153, merchant drop ship information 154, supplier drop ship rules 155, and/or supplier drop ship information 156) have been generated, collected, etc. (e.g., through user input, system administrator/ manager input, obtained from other systems, etc.) and stored in one or more databases (e.g., database 150) for use by the drop shipping management logic.

At block 201 of flow 200, the drop shipping management logic applies one or more drop ship rules to merchant drop ship information for a selling merchant in a transaction with a purchaser and applies supplier drop ship rules to supplier drop ship information for one or more other merchants to determine if an item of the transaction is to be fulfilled through drop shipping. For example, the drop shipping management logic may utilize merchant drop ship rules with respect to merchant drop ship information, possibly with other information, for determining whether drop shipping is to be provided for the selling merchant with respect to one or more items. Likewise, the drop shipping management logic may utilize supplier drop ship rules with respect to supplier drop ship information, possibly with other information, for determining if other merchants may be candidates for use as drop ship suppliers to provide drop shipping with respect to one or more items. Where both drop shipping is to be provided for the selling merchant and one or more other merchants are drop ship supplier candidates, operation according to flow 200 may proceed to select a merchant as a drop ship supplier with respect to one or more items.

The drop shipping management logic may apply one or more merchant drop ship rules at block 201 of embodiments in determining whether drop shipping is to be provided for the selling merchant with respect to one or more items. For example, the drop shipping management logic may apply a merchant drop ship rule with information regarding the selling merchant electing to utilize drop shipping to provide threshold determination regarding whether further operation with respect to drop shipping for an item is to be performed. Thereafter, the drop shipping management logic may apply one or more merchant drop ship rules for determining whether drop shipping is to be provided for the item. For example, a merchant drop ship rule may be applied with respect to merchant inventory information and/or merchant drop ship information for the selling merchant to determine if an item in a transaction is out of stock or is an item complementary to and often purchased with an item in a transaction, and thus that drop shipping is to be provided for an item. Additionally or alternatively, a merchant drop ship rule may be applied with respect to merchant inventory information and/or merchant drop ship information for the selling merchant and/or merchant inventory information and/or supplier drop ship information for a merchant electing to be a supplier providing drop shipping to determine if drop shipping is available for an item. For example, a selling merchant may provide a selling price and a profit margin threshold (e.g., a minimum gross profit for making a drop ship sale of an item) for the item (e.g., as part of the merchant inventory information and/or merchant drop ship information), and correspondingly a candidate drop ship supplier may provide a merchant remittance amount threshold (e.g., a minimum drop ship "wholesale" sales price from the drop ship supplier to the selling merchant), which may be used by a merchant drop ship rule in determining if drop shipping is available for an item for any particular transaction. If, for example, the selling merchant's profit margin threshold cannot be met at the selling merchant's selling price based upon the merchant remittance amount threshold of any candidate drop ship supplier, then the drop shipping management logic may determine that drop shipping is not to be provided for the selling merchant with respect to the item.

The drop shipping management logic may additionally or alternatively apply one or more supplier drop ship rules at block 201 of embodiments in determining whether drop shipping is to be provided for the selling merchant with respect to one or more items. For example, the drop shipping management logic may apply a supplier drop ship rule with information regarding merchants electing to be suppliers providing drop shipping to provide a determination regarding whether any drop ship supplier is available and thus further operation with respect to drop shipping for an item is to be performed. Thereafter, the drop shipping management logic may apply one or more supplier drop ship rules for determining merchants of a candidate supplier set for drop shipping an item. For example, a supplier drop ship rule may be applied with respect to merchant inventory information and/or supplier drop ship information for merchants electing to be suppliers providing drop shipping to identify a candidate supplier set of one or more merchants. Merchants electing to be suppliers providing drop shipping may, for example, identify particular items for which drop shipping may be provided and/or provide various other information, such as a remaining item inventory threshold (e.g., a minimum amount of inventory of an item the merchant wishes to hold back from drop shipping, such as to fulfill that merchant's own sales), and/or service level threshold (e.g., maximum shipping service level offered for drop ship items, minimum shipping service level accommodated with drop shipping, etc.), any or all of which may be used by a supplier drop ship rule in determining a candidate supplier set for drop shipping an item for any particular transaction. If, for example, the merchant has not elected to provide drop shipping for a particular item, the merchant drop shipping the item would place the inventory below the remaining item inventory threshold, or would require a shipping service level outside of one or more shipping service level threshold, the merchant may not be included in the candidate supplier set for the item of the particular transaction.

At block 202 of flow 200, the drop shipping management logic makes a determination as to whether an item of a transaction is to be provided drop shipping. For example, if applying merchant drop ship rules and/or supplier drop ship rules at block 201 indicates that drop shipping is not to be provided with respect to an item, if no merchants are included in a candidate supplier set for drop shipping an item, etc., the drop shipping management logic of embodiments may forego further drop shipping management processing with respect to that item (e.g., returning to block 201 for applying drop ship rules with respect to another item and/or another transaction). However, if applying merchant drop ship rules and/or supplier drop ship rules at block 201 indicates that drop shipping is to be provided with respect to an item and one or more merchants are included in a candidate supplier set for drop shipping an item, etc., the drop shipping management logic of embodiments may proceed with further drop shipping management processing with respect to that item (e.g., proceeding to block 203).

Additionally or alternatively, the drop shipping management logic of embodiments may make a determination as to whether an item is to be provided drop shipping based upon various operator control or input. For example, a merchant may provide information to indicate that a particular item or transaction is to be provided drop shipping, such as to address a particular need or situation (e.g., in order to provide expedited service in reshipping an item in association with an item return, to provide an elevated level of service for a particular purchaser, etc.). The merchant drop ship rules and/or supplier drop ship rules, or some portion thereof, may nevertheless be utilized for identifying a candidate supplier set for drop shipping the item.

At block 203 of flow 200, the drop shipping management logic selects a drop ship supplier for providing drop shipping with respect to the item. In accordance with the illustrated embodiment, the drop shipping management logic may analyze merchant rating information for merchants included in a candidate supplier set to determine a merchant as a drop ship supplier. For example, a supplier drop ship rule may be applied with respect to merchant rating information whereby one or more merchants of the candidate supplier set may be excluded from selection as the drop ship supplier based at least in part on supplier accuracy rating information for the one or more merchants failing to meet a supplier accuracy threshold. Additionally or alternatively, a supplier drop ship rule may be applied with respect to merchant rating information whereby a supplier time metric of supplier drop ship information is increased (e.g., time added, such as an hour, two hours, etc., to back off a stated shipping cutoff time for shipping orders that day by the merchant) for one or more merchants of the candidate supplier set based at least in part on the supplier time rating information for the one or more merchants failing to meet a supplier time threshold (e.g., failing to meet a predetermined percentage, such as 95%, 90%, 85%, 80%, etc., of items shipped by a stated shipping cutoff time). Such increases made with respect to supplier drop ship information may be incremental, such as based upon a magnitude by which a merchant fails to meet a supplier time threshold (e.g., an hour may be added to a stated shipping cutoff time for a merchant meeting the shipping cutoff time 90% of the time, whereas two hours may be added to a stated shipping cutoff time for a merchant meeting the shipping cutoff time 80% of the time). Thereafter, a merchant of the candidate supplier list may be selected for drop shipping the item. For example, a merchant of the candidate supplier list having one or more best metrics (e.g., highest supplier accuracy rating information metric, supplier time rating metric, etc.) and/or having a supplier time metric (e.g., a stated shipping cutoff time, as may have been increased according to operation of a supplier drop ship rule) facilitating meeting service level requirements of the purchaser.

The drop shipping management logic may implement permutation logic in operation according to block 203. For example, a permutation engine of the drop shipping management logic may be utilized to analyze various permutations of drop ship supplier selections for adequately serving multiple transactions occurring between merchants and purchasers in the electronic marketplace.

Having selected a merchant as a drop ship supplier for an item, flow 200 of FIG. 2 proceeds to block 204 for initiating management of item drop shipping by the drop ship supplier. For example, the drop shipping management logic may provide information to shipping management logic operable with respect to the merchant selected as a drop ship supplier identifying the item(s) to be drop shipped, the merchant selected to provide the drop shipping, the purchaser of the item(s), etc., such as to institute a drop ship order for the item(s) from the merchant. Because the merchant selected as the drop ship supplier may potentially be a competing merchant to the selling merchant, the drop shipping management logic may withhold certain purchaser information (e.g., email address, telephone number, etc.) from the shipping management logic and/or drop ship supplier, and/or may instruct or control the shipping management logic to withhold purchaser information from the drop ship supplier. Thereafter, one or more items of an electronic marketplace transaction may be fulfilled using drop shipping by a merchant participating as a drop ship supplier.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

What is claimed is:

1. A method for fulfilling an order placed in an electronic marketplace in which a plurality of merchants of the electronic marketplace have elected to offer drop shipping of items on behalf of merchants of the electronic marketplace, the method comprising:
    determining that an item is to be fulfilled through drop shipping by applying merchant drop ship rules to merchant drop ship information for a merchant of the electronic marketplace conducting a transaction with a purchaser in the electronic marketplace and supplier drop ship rules to supplier drop ship information for one or more other merchants of the plurality of merchants of the electronic marketplace;
    determining a merchant as a drop ship supplier of the item from a candidate supplier set of merchants of the one or more other merchants by analyzing merchant rating information, wherein the merchant rating information includes supplier accuracy rating information and supplier time rating information;
    initiating drop shipping of the item by the drop ship supplier to fulfill the order placed in the electronic marketplace using drop shipping by the merchant of the candidate supplier set of merchants as the drop ship supplier; and
    protecting information regarding a purchaser from the drop ship supplier at least until a shipping label is printed for the drop shipping of the item.

2. The method of claim 1, wherein the item is not stocked by the merchant, and wherein applying the merchant drop ship rules and the supplier drop ship rules to determine if an item is to be fulfilled through drop shipping comprises:
    analyzing the merchant drop ship information with respect to an item drop ship rule of the merchant drop ship rules to determine if the item is to be offered by the merchant to the purchaser in the transaction.

3. The method of claim 1, wherein the item is stocked by the merchant, and wherein applying the merchant drop ship rules and the supplier drop ship rules to determine if an item is to be fulfilled through drop shipping comprises:
analyzing the merchant drop ship information with respect to a localized item fulfillment rule of the merchant drop ship rules to determine if the item is to be drop shipped rather than shipped by the merchant.

4. The method of claim 1, wherein applying the merchant drop ship rules and the supplier drop ship rules to determine if an item is to be fulfilled through drop shipping comprises:
analyzing merchant sale criteria of the merchant drop ship information for the merchant with respect to an item drop ship rule of the merchant drop ship rules to determine if drop shipping of the item by one or more merchants of the candidate supplier set meets the merchant sale criteria.

5. The method of claim 4, wherein the merchant sale criteria include at least one criterion selected from the group consisting of an election by the merchant to utilize drop shipping, a sales price for the item, and a profit margin threshold for the item.

6. The method of claim 1, wherein applying the merchant drop ship rules and the supplier drop ship rules to determine if an item is to be fulfilled through drop shipping comprises:
analyzing supplier drop ship criteria of the supplier drop ship information with respect to an item drop ship rule of the merchant drop ship rules to determine if drop shipping of the item by one or more merchants of the plurality of merchants meets the supplier drop ship criteria.

7. The method of claim 6, wherein the supplier drop ship criteria include at least one criterion selected from the group consisting of an election to provide drop shipping with respect to the item by respective merchants of the plurality of merchants, remaining item inventory threshold for respective merchants of the plurality of merchants, merchant remittance amount threshold for respective merchants of the plurality of merchants, and service level threshold for respective merchants of the plurality of merchants.

8. The method of claim 6, wherein applying the merchant drop ship rules and the supplier drop ship rules to determine if an item is to be fulfilled through drop shipping comprises:
analyzing the supplier drop ship criteria with respect to a candidate supplier rule of the supplier drop ship rules to identify the candidate supplier set.

9. The method of claim 8, wherein analyzing the supplier drop ship criteria to identify the candidate supplier set comprises:
including the one or more merchants of the plurality of merchants, for which drop shipping of the item meets the supplier drop ship criteria for a merchant of the one or more merchants, in the candidate supplier set.

10. The method of claim 1, wherein the supplier accuracy rating information of the merchant rating information comprises an order fulfillment accuracy metric for orders placed in the electronic marketplace fulfilled by respective merchants of the candidate supplier set.

11. The method of claim 1, wherein the supplier time rating information of the merchant rating information comprises an item shipped when order placed by cutoff time metric for orders placed in the electronic marketplace fulfilled by respective merchants of the candidate supplier set.

12. The method of claim 1, wherein analyzing the merchant rating information to determine the drop ship supplier comprises:
comparing supplier accuracy rating information and supplier time rating information of the supplier accuracy rating information for respective merchants of the candidate supplier set.

13. The method of claim 12, wherein analyzing the merchant rating information to determine the drop ship supplier comprises:
excluding one or more merchants of the candidate supplier set from selection as the drop ship supplier based at least in part on the supplier accuracy rating information for the one or more merchants failing to meet a supplier accuracy threshold.

14. The method of claim 12, wherein analyzing the merchant rating information to determine the drop ship supplier comprises:
increasing a supplier time rating metric of the supplier drop ship information for one or more merchants of the candidate supplier set based at least in part on the supplier time rating information for the one or more merchants failing to meet a supplier time threshold.

15. The method of claim 1, wherein protecting the information regarding the purchaser from the drop ship supplier comprises:
withholding identification of the purchaser until a shipping label is printed for the drop shipping.

16. The method of claim 1, wherein protecting the information regarding the purchaser from the drop ship supplier comprises:
utilizing a unique code for the drop shipping without providing identification of the purchaser to the drop ship supplier.

17. A system for fulfilling an order placed in an electronic marketplace in which a plurality of merchants of the electronic marketplace have elected to offer drop shipping of items on behalf of merchants of the electronic marketplace, the system comprising:
at least one memory storing drop shipping management logic, shipping management logic, and one or more databases, the one or more databases storing merchant inventory information, merchant rating information, merchant drop ship rules, merchant drop ship information, supplier drop ship rules, and supplier drop ship information; and
one or more processors coupled to the at least one memory and configured to execute logic stored by the at least one memory, the logic including:
the drop shipping management logic configured to determine that an item is to be fulfilled through drop shipping by applying one or more rules of the merchant drop ship rules to information of the merchant drop ship information for a merchant of the electronic marketplace conducting a transaction with a purchaser in the electronic marketplace and one or more rules of the supplier drop ship rules to information of the supplier drop ship information for one or more other merchants of the plurality of merchants of the electronic marketplace, wherein the drop shipping management logic is further configured to determine a merchant as a drop ship supplier of the item from a candidate supplier set of merchants of the one or more other merchants by analyzing merchant rating information, and wherein the drop shipping management logic is further configured to initiate drop shipping of the item by the drop ship supplier for fulfilling the order placed in the electronic marketplace using drop shipping by the merchant of the candidate supplier set of the merchants as the drop ship supplier; and the shipping management logic configured to operate under control of the drop shipping management logic to protect information regarding a purchaser from the drop ship supplier at least until a shipping label is printed for the drop shipping of the item.

18. The system of claim 17, wherein the drop shipping management logic is part of a web-based server system operating with respect to an electronic marketplace environment including the electronic marketplace, wherein the server system is in communication with a plurality of merchant systems and a plurality of purchaser systems operable to perform transactions using the electronic marketplace.

19. The system of claim 18, wherein the shipping management logic is also part of the web-based server system.

20. The system of claim 18, wherein the web-based server system is in communication with a web-based server system comprising the shipping management logic.

21. The system of claim 17, wherein the item is not stocked by the merchant, and wherein the drop shipping management logic is configured to analyze the information of the merchant drop ship information with respect to an item drop ship rule of the one or more merchant drop ship rules to determine if the item is to be offered by the merchant to the purchaser in the transaction.

22. The system of claim 17, wherein the item is stocked by the merchant, and wherein the drop shipping management logic is configured to analyze the information of the merchant drop ship information with respect to a localized item fulfillment rule of the one or more merchant drop ship rules to determine if the item is to be drop shipped rather than shipped by the merchant.

23. The system of claim 17, wherein the information of the merchant drop ship information comprises merchant sale criteria, and wherein the drop shipping management logic is configured to analyze the merchant sale criteria with respect to an item drop ship rule of the one or more merchant drop ship rules to determine if drop shipping of the item by one or more merchants of the candidate supplier set meets the merchant sale criteria.

24. The system of claim 23, wherein the merchant sale criterion include criteria include at least one criterion selected from the group consisting of an election by the merchant to utilize drop shipping, a sales price for the item, and a profit margin threshold for the item.

25. The system of claim 17, wherein the information of the supplier drop ship information comprises supplier drop ship criteria, and wherein the drop shipping management logic is configured to analyze the supplier drop ship criteria with respect to an item drop ship rule of the one or more merchant drop ship rules to determine if drop shipping of the item by one or more merchants of the plurality of merchants meets the supplier drop ship criteria.

26. The system of claim 25, wherein the supplier drop ship criteria include at least one criterion selected from the group consisting of an election to provide drop shipping with respect to the item by respective merchants of the plurality of merchants, remaining item inventory threshold for respective merchants of the plurality of merchants, merchant remittance amount threshold for respective merchants of the plurality of merchants, and service level threshold for respective merchants of the plurality of merchants.

27. The system of claim 25, wherein the drop shipping management logic is configured to analyze the supplier drop ship criteria with respect to a candidate supplier rule of the one or more supplier drop ship rules to identify the candidate supplier set.

28. The system of claim 17, wherein the merchant rating information includes supplier accuracy rating information and supplier time rating information.

29. The system of claim 28, wherein the supplier accuracy rating information of the merchant rating information comprises an order fulfillment accuracy metric for orders placed in the electronic marketplace fulfilled by respective merchants of the candidate supplier set.

30. The system of claim 28, wherein the supplier time rating information of the merchant rating information comprises an item shipped when order placed by cutoff time metric for orders placed in the electronic marketplace fulfilled by respective merchants of the candidate supplier set.

31. The system of claim 28, wherein the drop shipping management logic is configured to compare supplier accuracy rating information and supplier time rating information of the supplier accuracy rating information for respective merchants of the candidate supplier set.

32. The system of claim 31, wherein the drop shipping management logic is configured to exclude one or more merchants of the candidate supplier set from selection as the drop ship supplier based at least in part on the supplier accuracy rating information for the one or more merchants failing to meet a supplier accuracy threshold.

33. The system of claim 31, wherein the drop shipping management logic is configured to increase a supplier time rating metric of the supplier drop ship information for one or more merchants of the candidate supplier set based at least in part on the supplier time rating information for the one or more merchants failing to meet a supplier time threshold.

34. The system of claim 17, wherein the shipping management logic is configured to withhold identification of the purchaser until a shipping label is printed for the drop shipping.

35. The system of claim 17, wherein the shipping management logic is configured to utilize a unique code for the drop shipping without providing identification of the purchaser to the drop ship supplier.

36. A method for fulfilling an order placed in an electronic marketplace in which a plurality of merchants of the electronic marketplace have elected to offer drop shipping of items on behalf of merchants of the electronic marketplace, the method comprising:

determining that further drop ship processing is to be provided with respect to a transaction by applying one or more merchant drop ship rules to merchant drop ship information for a merchant of the electronic marketplace conducting the transaction with a purchaser in the electronic marketplace;

identifying a candidate supplier set of merchants for consideration as one or more drop ship suppliers for the transaction by applying one or more supplier drop ship rules to supplier drop ship information for one or more other merchants of the plurality of merchants of the electronic marketplace;

excluding one or more merchants from the candidate supplier set from selection as the one or more drop ship suppliers based at least in part on applying one or more supplier drop ship rules to merchant rating information for merchants of the candidate supplier set;

selecting a merchant from the candidate supplier set as a drop ship supplier of the one or more drop ship suppliers;

initiating drop shipping of an item or items by the drop ship supplier for fulfilling the order placed in the electronic marketplace using drop shipping by the merchant selected from the candidate supplier set as the drop ship supplier; and protecting information regarding the purchaser from the drop ship supplier at least until a shipping label is printed for shipping the item or items.

37. The method of claim 36, wherein selecting the merchant from the candidate supplier set comprises:

selecting a merchant of the candidate supplier set having one or more best metrics from the group consisting of a highest supplier accuracy rating information metric and a supplier time rating metric, wherein the supplier accuracy rating information metric and the supplier time rating metric comprise information of the merchant rating information.

38. The method of claim 36, wherein selecting the merchant from the candidate supplier set comprises:

selecting a merchant of the candidate supplier list set having a supplier time metric facilitating meeting service level requirements for the transaction.

39. The method of claim 38, wherein applying the one or more supplier drop ship rules to merchant rating information comprises:

increasing a supplier time rating metric of the supplier drop ship information for one or more merchants of the candidate supplier set based at least in part on supplier time rating information for the one or more merchants failing to meet a supplier time threshold, wherein the supplier time rating metric as increased is used for the selecting the merchant of the candidate supplier set.

40. The method of claim 36, wherein selecting the merchant from the candidate supplier set comprises:

analyzing a plurality of permutations of drop ship supplier selections for adequately serving multiple transactions occurring between merchants and purchasers in the electronic marketplace.

* * * * *

UNITED STATES PATENT AND TRADEMARK OFFICE
CERTIFICATE OF CORRECTION

| | |
|---|---|
| PATENT NO. | : 11,334,844 B1 |
| APPLICATION NO. | : 16/802364 |
| DATED | : May 17, 2022 |
| INVENTOR(S) | : Sebastian Buerba et al. |

It is certified that error appears in the above-identified patent and that said Letters Patent is hereby corrected as shown below:

In the Claims

At Column 21, Claim number 24, Line number 44, delete "criterion include criteria include" and replace with --criteria include--.
At Column 24, Claim number 38, Line number 1, delete "supplier list set" and replace with --supplier set--.

Signed and Sealed this
Twenty-eighth Day of June, 2022

Katherine Kelly Vidal
*Director of the United States Patent and Trademark Office*